Jan. 12, 1937.  J. T. POTTS  2,067,647
BELT AND METHOD OF MAKING SAME
Filed Aug. 8, 1935

INVENTOR
John T. Potts
by Barker, Gochnow & Harner
ATTORNEYS.

Patented Jan. 12, 1937

2,067,647

UNITED STATES PATENT OFFICE 2,067,647

BELT AND METHOD OF MAKING SAME

John T. Potts, Salt Lake City, Utah, assignor to Hewitt Rubber Corporation, Buffalo, N. Y.

Application August 8, 1935, Serial No. 35,326

10 Claims. (Cl. 154—4)

This invention relates to belts, and particularly to those which operate at relatively high speeds.

An object of this invention is to provide an improved belt which will operate successfully at high speeds and through sharp turns; which will undergo a minimum of deterioration when used under adverse conditions, such as dust, dirt and heat; which will provide longer and more satisfactory service than heretofore possible; which will run over pulleys in an exceptionally smooth and true manner and with a minimum of slippage; with which the tractive power is increased; which will operate successfully under less tension than heretofore; with which internal frictional heat is dissipated quickly; and which will be relatively simple, satisfactory, durable and inexpensive.

Another object of the invention is to provide an improved method of making a belt which will have greater durability and life, which will operate under a minimum of tension and with a minimum of slippage on the pulleys, and which will have the maximum of tractive power.

Other objects and advantages will be apparent from the following description of an embodiment of the invention, and the novel features will be particularly pointed out hereinafter in connection with the appended claims.

Figure 1:
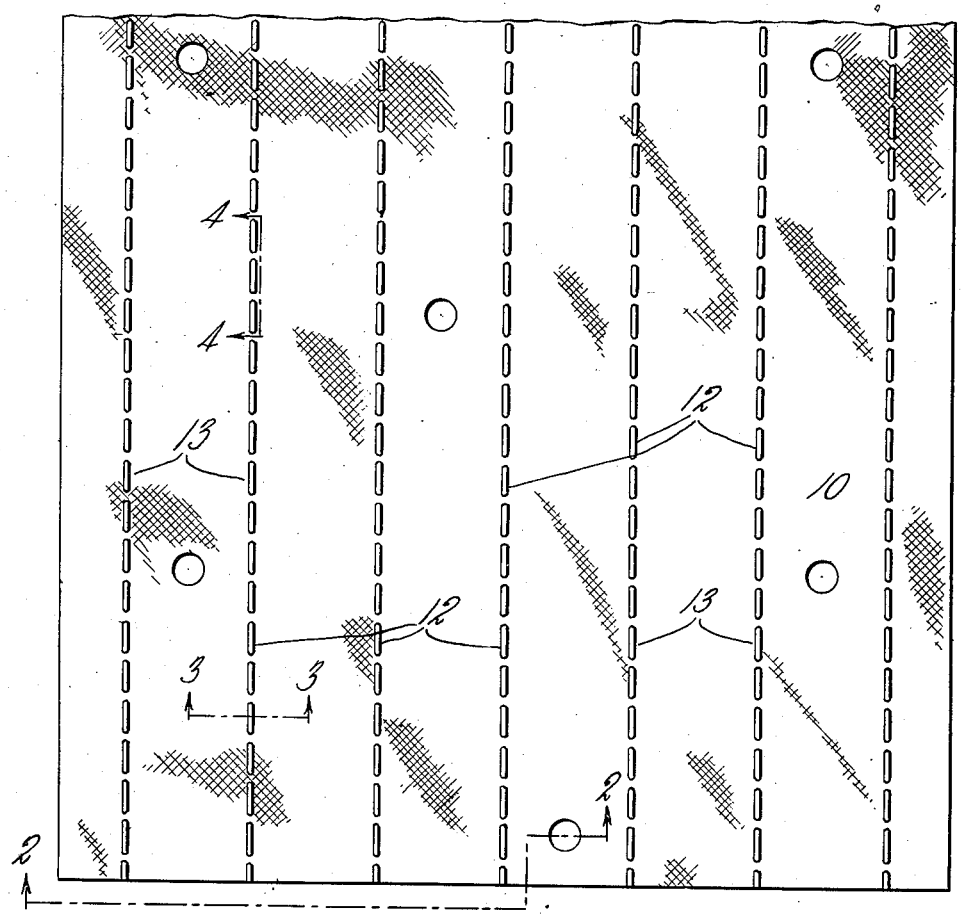
Fig. 1 is a plan of a strip of belting constructed in accordance with this invention.
Figure 2:
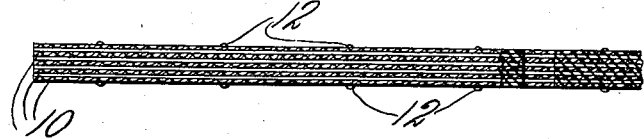
Fig. 2 is an end elevation of a portion of the same, partly in section, the section and elevation being taken approximately along the line 2—2, Fig. 1.
Figure 3:
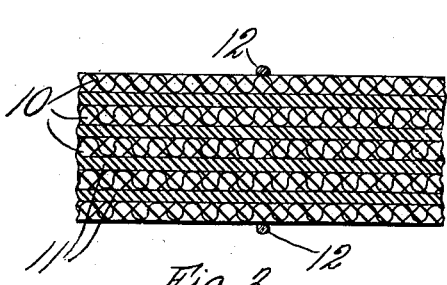
Fig. 3 is a sectional elevation of a portion of the belt on a larger scale, the section being taken approximately along the line 3—3, Fig. 1.
Figure 4:
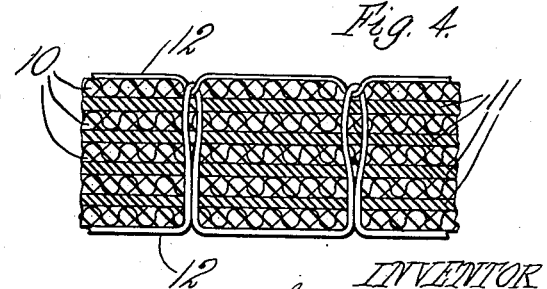
Fig. 4 is another sectional elevation of a portion of the belt, with the section taken approximately along the line 4—4, Fig. 1.

In the illustrated embodiment of the invention, the improved belt is made up of a plurality of superposed layers or strips 10 of a suitable fabric, preferably a woven fabric such as cotton duck, which layers are separated from one another by layers 11 of rubber of substantial thickness, as shown in Figs. 3 and 4. The layers of rubber and fabric, which are superposed face to face in this manner, are stitched together by cotton or other suitable cords 12. The stitching is arranged in rows 13, Fig. 1, which are in spaced parallel relation across the width of the belt and progressing in a direction endwise of the belt. The stitching passes entirely through all of the superposed layers, and the cords thereof interlock in any suitable manner, one of which is shown in Fig. 4.

In the manufacture of such a belt, the cotton duck or other fabric is preferably first coated with a layer of unvulcanized rubber and the fabric strips then brought together face to face, which interposes rubber layers between the adjacent faces of the fabric. The multiple plies or layers of fabric and unvulcanized rubber are then stitched to one another in the manner illustrated in the drawing, in spaced parallel rows running lengthwise of the belt and with the stitching passing entirely through all the layers. The stitched belt is then vulcanized in the conventional manner by heat and pressure. The belt may be stretched either during the vulcanization or subsequently thereto, but preferably during the vulcanization. The laminated belt constructed in this manner is then perforated with unrestricted, direct holes or apertures passing entirely from face to face of the belt, and arranged in spaced relation to one another across the width of the belt as well as at intervals along the same.

These holes are of substantial or appreciable size in contrast to mere pin hole apertures. For example, in one sample of a belt constructed in accordance with this invention, the belt is 7" wide and of any desired length, and formed of any desired number of layers of cotton duck, such as five layers, vulcanized together by interposed coatings of rubber. The stitching of a strong durable cord extends lengthwise of the belt in parallel rows that are separated about an inch. The holes are preferably arranged in the spaces between the rows of stitching and separated from one another by approximately two inches in a direction lengthwise of the belting and two inches in a direction crosswise of the belting. These holes are $\tfrac{5}{16}$ of an inch in diameter and punched through the belt from face to face.

Belts of this type have given excellent results and are very satisfactory when used on high speed machines such as in driving centrifugal machines in sugar factories, in operating high speed pumps, and also when used in mining and cement mill plants where extreme dust and dirt conditions are encountered. Belts made in accordance with this invention have been found to give much longer and more satisfactory service than laminated belts stitched or perforated, or laminated belts stitched but not perforated, or laminated belts perforated but not stitched.

The use of the stitching together with the perforations in such a belt will cause the belt to run over the pulleys even at a large range of angles in a very direct and smooth manner, the tractive power is increased, less slippage occurs on the pulleys, the belts can be operated under less tension, and the internal frictional heat is dissipated more quickly. With such a belt, the use of a belt dressing is unnecessary, and the escape of dirt and dust collections on the face of pulleys is provided for, and the life and satisfactory operation of the belt are very materially increased.

While the perforations are preferably punched after the laminations have been vulcanized together, the perforating can be done before the vulcanization. The arrangement and spacing of the rows of stitching and the disposition of the holes can also be varied considerably from the example given, and in the principle and scope of the invention.

It will also be understood that various changes in the details and materials, which have been herein expressly described and illustrated in order to explain the nature of the invention by way of example, may be made by those skilled in the art within the principle and scope of the invention as expressed in the appended claims.

I claim as my invention:

1. A rubberized fabric belt comprising laminations of rubber and fabric disposed face to face alternately, with distinct layers of rubber spacing the fabric layers from one another, said layers being stitched together by rows of stitching running lengthwise of the belt, the threads of the stitching of each row progressing lengthwise of the belt and being continuous and uncut substantially from end to end of the belt, and the stitched layers having perforations of substantial size arranged therein at spaced intervals along and across the same and extending from face to face of the belt and cooperating with the stitching to increase the service life of the belt.

2. A rubberized fabric belt comprising laminations of rubber and fabric, superposed face to face with layers of rubber substantially spacing the fabric layers from one another, said layers being stitched together by a plurality of rows of stitching running in a direction lengthwise of the belt, the thread of each row being uncut and continuous over substantially the entire length of the belt, said belt having a plurality of apertures of substantial size passing through all the laminations from face to face of the belt, and arranged at intervals across the width of the belt and lengthwise thereof and cooperating with the stitching to increase the service life of the belt.

3. A rubberized fabric belt comprising a plurality of laminations of rubber and fabric, each of substantial thickness, superposed face to face to provide a multi-layer belt, with distinct layers of rubber of substantial thickness substantially spacing the fabric layers from one another, a plurality of rows of stitching through all the layers, disposed at intervals across the width of the belt, and progressing in a direction lengthwise of the belt, the thread of each row being uncut and continuous over substantially the entire length of the belt, said layers and stitching being vulcanized together, said belt having apertures of substantial size passing entirely from face to face of the belt and disposed at intervals across and lengthwise of the belt and cooperating with the stitching to increase the service life of the belt.

4. A high speed belt comprising a plurality of distinct layers of rubber and fabric disposed face to face, with the fabric layers spaced from one another by the rubber layers of substantial thickness connected by a plurality of rows of stitching disposed at intervals across the width of the belt, extending from face to face of the belt, the thread of each row of stitching being continuous and uncut substantially from end to end of the belt, and progressing in a direction lengthwise of the belt, the layers and stitching being all vulcanized together with a rubber compound, said belt having a plurality of apertures of substantial size extending from face to face of the belt and disposed at intervals across and lengthwise of the belting and cooperating with the stitching to increase the service life of the belt.

5. A high speed belt comprising a plurality of distinct layers of rubber and fabric disposed alternately face to face with the rubber layers substantially separating the fabric layers, and all layers stitched together by a plurality of rows of stitching disposed at intervals across the width of the belt, extending through all of the layers and progressing in a direction lengthwise of the belt, the thread of each row being continuous and uncut substantially throughout the length of the belt, the rubber, fabric and stitching being vulcanized together, and said belting having apertures of substantial size passing entirely therethrough from face to face and disposed at intervals across and lengthwise of said belt and cooperating with the stitching to increase the service life of the belt.

6. The method of making a belt which comprises superposing distinct layers of fabric and unvulcanized rubber alternately, with the rubber layers substantially spacing the fabric layers, stitching the layers together by suitable cords passing through all of the layers and progressing in directions lengthwise of the belt in rows disposed across the width of the belt, with the thread of each row progressing substantially unbroken and continuously from end to end of a length of belt, vulcanizing together the layers and stitching while the thread in each row is unbroken, and punching holes of substantial size in the belt from face to face thereof at intervals across the width of the belt and lengthwise thereof, for cooperation with the spaced fabric layers and stitching to increase the service life of the belt.

7. The method of making a belt which comprises superposing distinct layers of fabric and unvulcanized rubber alternately, in face to face relation to one another, with the rubber layers substantially spacing apart the fabric layers, stitching the superposed layers together with a suitable cord, with the stitching arranged in rows spaced apart across the width of the belt and progressing in a direction lengthwise thereof, with the thread of each row progressing substantially unbroken and continuously from end to end of a length of belt, vulcanizing the stitched fabric layers together while under endwise tension and while the thread in each row is unbroken, and punching apertures of substantial size through the belt from face to face thereof and spaced apart across the width of the belt and also in a direction lengthwise thereof for cooperation with the spaced fabric layers and stitching to increase the service life of the belt.

8. The method of making a belt which comprises coating a fabric with unvulcanized rubber, disposing strips of the fabric in face to face relation to one another in superposed layers, stitching the superposed layers together with a suitable cord, with the stitching arranged in rows spaced apart across the width of the belt and progressing in a direction lengthwise thereof, vulcanizing the stitched fabric layers together, and concomitantly stretching the superposed layers in a lengthwise direction, and punching apertures of substantial size through the belt from face to face thereof and spaced apart across the width of the belt and also in a direction lengthwise thereof.

9. The method of making a belt which comprises coating a fabric with unvulcanized rubber, disposing strips of the fabric in face to face relation to one another in superposed layers, stitching the superposed layers together with a suitable cord, with the stitching arranged in rows spaced apart across the width of the belt and progressing in a direction lengthwise thereof, vulcanizing the stitched fabric layers together under heat and pressure and concomitantly stretching the same in a lengthwise direction, and punching apertures of substantial size through the belt from face to face thereof and spaced apart across the width of the belt and also in a direction lengthwise thereof.

10. A high speed belt comprising a plurality of layers of rubber and fabric disposed alternately face to face, and connected by cords stitched in substantially unbroken lines from face to face of the layers, the rubber, fabric and cords being vulcanized together while the layers are under lengthwise tension, said belt having unrestricted apertures of substantial size passing entirely therethrough from face to face and disposed at intervals across and lengthwise of the belt.

JOHN T. POTTS.